T. W. JANSEN.
MACHINE FOR BURNING IN AND BURNISHING ENGINE BEARINGS.
APPLICATION FILED OCT. 22, 1918.
1,353,164.
Patented Sept. 21, 1920.
2 SHEETS—SHEET 1.
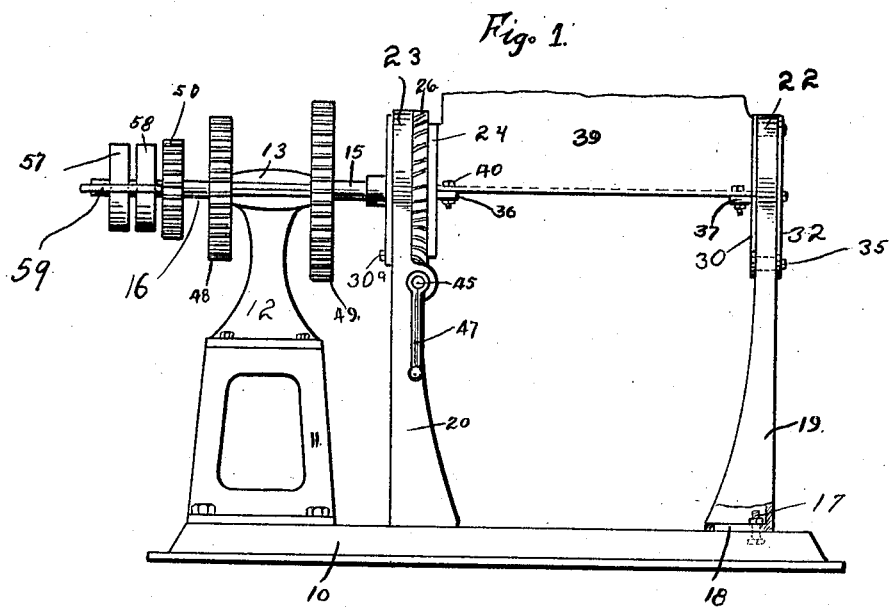
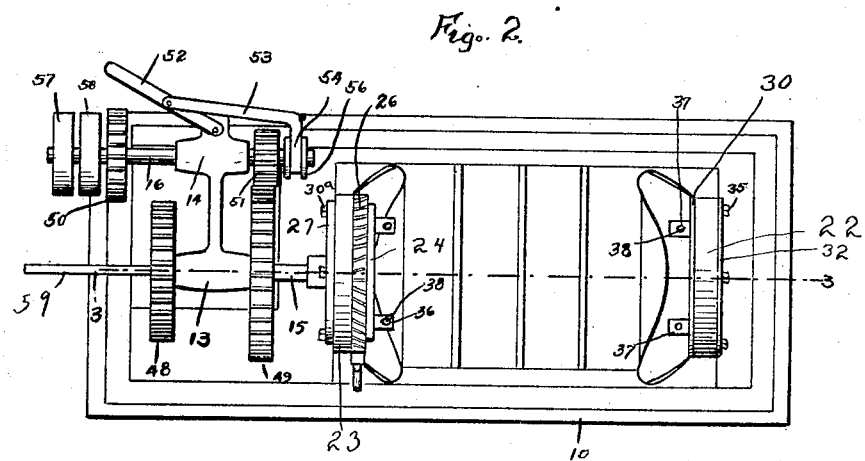

T. W. JANSEN.
MACHINE FOR BURNING IN AND BURNISHING ENGINE BEARINGS.
APPLICATION FILED OCT. 22, 1918.
1,353,164.
Patented Sept. 21, 1920.
2 SHEETS—SHEET 2.
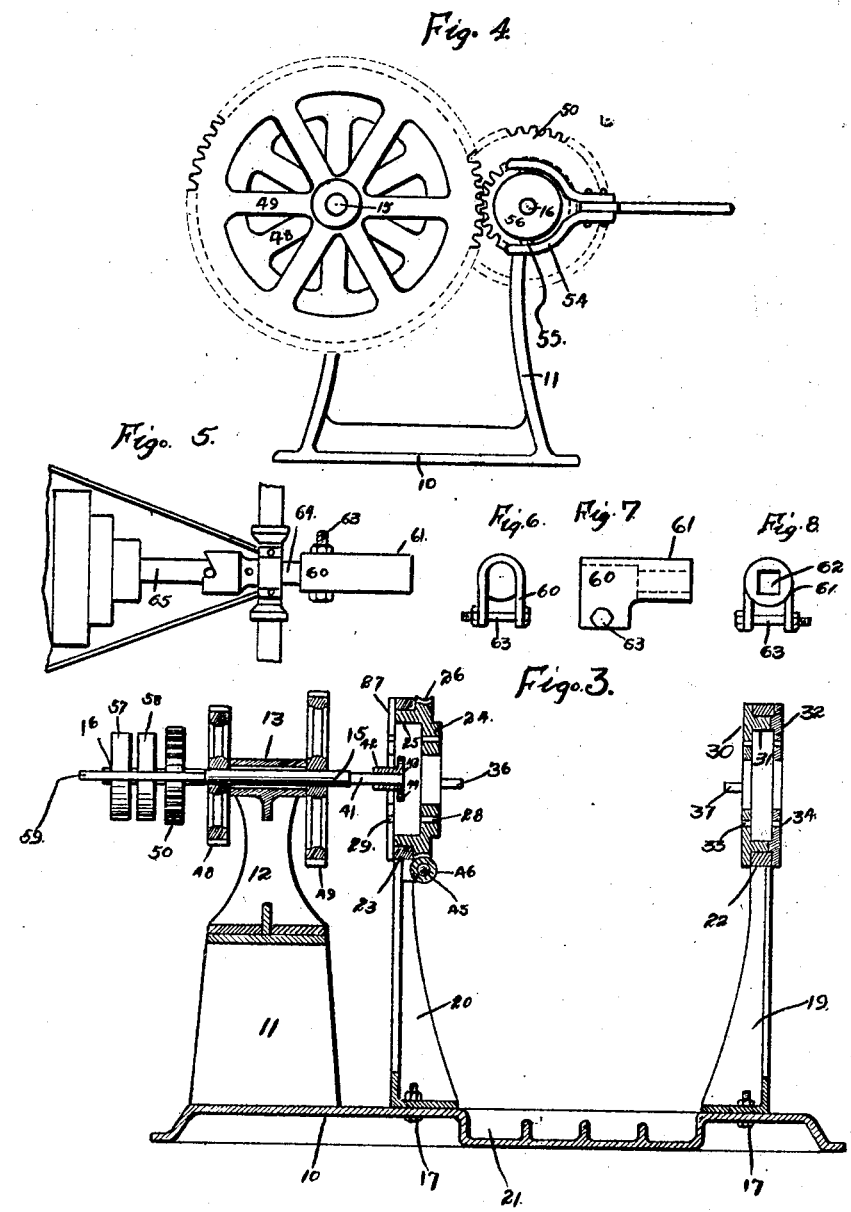

UNITED STATES PATENT OFFICE.

THEODORE W. JANSEN, OF DES MOINES, IOWA.

MACHINE FOR BURNING IN AND BURNISHING ENGINE-BEARINGS.

1,353,164.  Specification of Letters Patent.  Patented Sept. 21, 1920.

Application filed October 22, 1918.  Serial No. 259,264.

*To all whom it may concern:*

Be it known that I, THEODORE W. JANSEN, a citizen of the United States, and resident of Des Moines, in the county of Polk and State of Iowa, have invented a certain new and useful Machine for Burning In and Burnishing Engine-Bearings, of which the following is a specification.

The object of my invention is to provide a machine of simple, durable and inexpensive construction for burning and running in or burnishing engine bearings.

More particularly it is my object to provide such a machine adapted to operate the shaft of an automobile engine while the engine is mounted on the frame of a machine.

Still a further object is to provide such a device having means whereby it may be connected with the hand crank on an engine shaft.

Still a further object is to provide such a machine having gearing connections whereby the operating shaft of the machine may be run at different speeds.

A further object is to provide in such a machine, means for supporting an engine block in position with the engine shaft in alinement and operatively connected with a shaft of the machine.

Still a further object is to provide such means, capable of movement for rotating the block to a variety of positions for permitting convenient access to all parts of the block.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a machine embodying my invention.

Fig. 2 shows a top or plan view of the same.

Fig. 3 shows a vertical, central, longitudinal, sectional view through the machine.

Fig. 4 shows a front elevation of the machine.

Fig. 5 shows an enlarged, detail, plan view of part of the machine connected with the hand crank of an automobile, and Figs. 6, 7 and 8 show detail views of the device for connecting the machine with the hand crank on an engine shaft.

It will be understood that in repairing automobile engines, it frequently becomes necessary to repair the bearings by putting in new Babbitt bearings, and that when this is done the Babbitt bearings must be fitted as well as can be conveniently done, and thereafter it is desirable to run the engine shaft from an outside source for thoroughly smoothing the new bearings. This process is sometimes called "burning in" the bearings. It is also desirable after the bearings have been burned in to run them in oil to accomplish what is known as "oil burnishing" or running in the bearings.

The objects of my invention are as before stated, and include the furnishing of a machine with which an engine mounted on the frame of the automobile may be readily connected for operating the engine shaft for the burnishing process.

In the accompanying drawings, illustrative of my invention, I have used the reference numeral 10 to indicate generally the base upon which the machine is supported. The machine may be anchored to the floor or a suitable support if desired.

Secured to the base is an upright support 11. Above the support 11 is mounted a block 12 having spaced parallel bearings 13 and 14, in which are rotatably mounted shafts 15 and 16. In Fig. 3 one end of the shaft 15 is broken away.

In the base 10 are bolts 17 which are extended through openings in the bottoms of spaced uprights 19 and 20. The openings in the bottom of the upright 19 are elongated slots 18.

A portion of the base 10 is provided with a plurality of shallow compartments 21 to receive bolts, nuts and the like from the engine block.

At the upper end of the uprights 19 and 20 are bearings 22 and 23 having large openings. Adjacent to the bearing 23 is an annular disk 24 having formed thereon a laterally extending annular flange 25 snugly received within the bearing 23 and adapted to rotate therein. Formed on the disk 24 is a worm wheel 26.

On the opposite side of the bearing from the disk 24 is a plate 27. The disk 24 and plate 27 have openings 28 and 29 which register with each other to receive bolts 30ª for securing the disk and plate together for forming a rotary member mounted within the bearing member 23.

Adjacent to the bearing 22 is a disk 30 having formed thereon an annular flange 31 received within the bearing 22. On the opposite side of the bearing 22 is a plate 32. The disk 30 and plate 32 have openings 33 and 34 to receive bolts 35 for securing said disk and plate together. The disks 24 and 30 have formed thereon on their adjacent surfaces, spaced pairs of lugs 36 and 37. In each of these lugs is an opening 38 to receive a bolt.

An engine block 39 may be placed with the flange thereon resting upon the lugs 36 and 37, and may be bolted thereto by bolts 40, and when in such position the engine shaft will be alined with the shaft 15. It may be mentioned in this connection that the disks and plates heretofore mentioned have central openings. One end of the engine shaft projects into the opening in the disk 30, and the rear end projects into the opening in the disk 24.

The end of the shaft 15 adjacent to the upright 20 is squared at 41, and received on said squared end is a sleeve 42 on which is an annular flange 43 adapted to coact with the flange on the rear end of the engine shaft and to be secured thereto by pins or the like extended through openings 44 in the flange 43.

Mounted in suitable bearings below the disk 24 is a shaft 45 on which is formed a worm gear 46 which meshes with the worm wheel 26. On one end of the shaft 45 is a crank handle 47, whereby the shaft 45 may be rotated for rotating the disk 24.

On the shaft 15 are fixed spaced gears 48 and 49 of different sizes. The shaft 16 is both slidably and rotatably mounted, and has fixed thereon spaced gears 50 and 51, so arranged that in one position of the sliding movement of the shaft 16 the gear 50 will mesh with the gear 48, while in another position of the shaft 16 the gear 51 will mesh with the gear 49. It will thus be seen that different speeds may be imparted to the shaft 15 from the shaft 16.

For shifting the shaft 16 I have provided a lever 52 pivoted to the bearing 14 at one end. Pivoted to the lever 52 between the ends of said lever, is an arm 53 having at its free end laterally extending spaced fingers 54, shown in Figs. 2 and 4. The fingers 54 have pins 55 extending into the groove of a grooved sleeve 56 fixed on the shaft 16.

On one end of the shaft 16 are spaced pulley wheels 57 and 58.

The end of the shaft 15 opposite the squared portion 41 extends outwardly from the member 12 beyond the end of the shaft 16, and is squared at 59.

For connecting the shaft 15 with a hand crank on an ordinary car, such, for instance, as a Ford, I have provided the following means:

There is provided a fitting comprising a U-shaped yoke member 60 designed to fit down over a crank. Formed on the yoke 60 is an extension 61, having an angular opening 62 therein to receive the squared portion 59 of the shaft 15. In the walls of the yoke 60 are opposite openings to receive a bolt 63.

In the use of the attachment just described, the ordinary crank handle 64 is allowed to hang down in the ordinary way. The yoke 60 is placed thereover, with the bolt 63 standing just rearwardly of the downwardly hanging part of the crank. The car may then be moved to position for causing the squared portion 59 of the shaft 15 to enter the angular opening 62, whereupon the rotation of the shaft 15 will impart rotation to the crank shaft 65 of the engine.

In the practical operation of my improved machine, if it is desired to burn in the bearings of an engine block, the engine block 39 is placed in position between the uprights 20 and 19 after the upright 19 has been moved away from the upright 20. Such movement of the upright 19 can be accomplished after loosening the nuts on the bolts 17. The block is swung into position by means of a crane or the like, and the upright 19 is shoved toward the upright 20 until the flanges of the block 39 rest on the lugs 36 and 37. The flanges of the engine block may then be bolted to the lugs 36 and 37. The engine shaft may then be locked to the shaft 15 and will be in alinement therewith.

It will be noted that the rotary members, comprised of the disks 24 and 30, the annular flanges thereon, and the plates 27 and 32 may be turned freely in the bearings 23 and 22.

After the engine block has been mounted in position as just described, the crank handle 47 may be manipulated for rotating or swinging the engine block around a line which is the extended longitudinal axis of the shaft 15. By thus swinging the block 39 to various positions, it will be seen that access may be readily had to the block in practically all positions thereof and from all sides thereof. By using the worm gear construction the block is easily locked in any of its adjusted positions.

One of the belt pulleys 57 and 58 may be connected with a line shaft or other source of power, for imparting rotation to the shaft 16. It will be understood that before connecting up the belt with one of the belt pulleys, the shaft 16 is adjusted to bring, for instance, the gear 51 into mesh with the gear 49.

Rotation may be imparted from the shaft 16 to the shaft 15 for burning in the bearings in the engine block. If, after the process has been partly completed, it is desired to increase the speed of the shaft 15, this can be accomplished by throwing off the belt, shifting the shaft 15 by means of the lever 52 until the gear 50 meshes with the gear 48, and changing the belt to the other belt pulley.

The advantage of being able to move the engine block 39 to any position of its rotary movement will be largely obvious from the foregoing description.

If it is desired to run the engine shaft in the engine while the latter is mounted on the car, from an outside power, this can readily be accomplished by installing the attachment hereinbefore described on the crank of the engine and then moving the engine to position where the squared portion 59 of the shaft 15 enters the angular opening 62 in the extension 61.

The bearings may then be run in by imparting rotation to the shaft 15 and therefrom to the engine shaft 65.

As a matter of fact, it is possible to operate one engine shaft from one end of the shaft 15, and another simultaneously from the other end of the shaft 15.

Some changes may be made in the construction and arrangement of the various parts of my device, without departing from the essential features and spirit of my invention, and it is my intention to cover by my claims any modified forms of structure or use of mechanical equivalents which may be reasonably included within their scope.

I claim as my invention:

1. In a device of the class described, a frame, a shaft mounted on said frame, means for mounting an engine block adjacent to one end of said shaft, means for operatively connecting said shaft with the shaft in the engine block, and means including a yoke and a removable bolt for fastening the other end of said shaft to the hand crank of an automobile.

2. In a device of the class described, a frame, a shaft on said frame, means for imparting rotation to said shaft and for throwing it into and out of gear, and means including a yoke and a coacting movable member for operatively connecting said shaft with the hand crank of an automobile.

3. In a device of the class described, a frame, a shaft on said frame, means for imparting rotation to said shaft, and for throwing it into and out of gear, and a fitting comprising a yoke and a coacting engaging device designed to be fixed on the hand crank of an automobile and to non-rotatably engage said shaft.

4. In a device of the class described, a frame, a shaft on said frame, means for imparting rotation to said shaft and for throwing it into and out of gear, said shaft having an angular end, a yoke member for securing an automobile hand crank to said shaft, having opposite holes in its arms, a belt extended through said holes, and an extension on said yoke member, having a hole to receive and fit said angular end.

5. In a device of the class described, a base, a pair of spaced uprights having annular openings in said uprights, disks having flanges rotatably received in said openings, said disks having central openings for permitting the shaft of an engine to extend therethrough, and means for securing an engine block between said disks.

6. In a device of the class described, a base, a pair of spaced uprights thereon having annular openings therein, disks having flanges rotatably received in said openings, said disks having lugs for supporting an engine block, and having central openings for permitting the shaft of an engine to extend therethrough, and means for rotating one of said disks.

7. In a device of the class described, a base, a pair of spaced uprights thereon having annular openings therein, disks having flanges rotatably received in said openings, said disks having lugs for supporting an engine block, and having central openings for permitting the shaft of an engine to extend therethrough, and means for rotating one of said disks, said means being adapted to hold said one of said disks in any position to which it may be adjusted.

Des Moines, Iowa, March 16, 1918.

THEODORE W. JANSEN.